United States Patent
Li et al.

(10) Patent No.: US 9,451,159 B2
(45) Date of Patent: Sep. 20, 2016

(54) PHOTOGRAPHING STARTING APPARATUS AND METHOD FOR BUILT-IN CAMERA OF PORTABLE DATA PROCESSING DEVICE

(71) Applicant: TENCENT TECHNOLOGY (SHENZHEN) COMPANY LIMITED, Shenzhen (CN)

(72) Inventors: Feiyun Li, Shenzhen (CN); Shizhu Huang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 14/729,739

(22) Filed: Jun. 3, 2015

(65) Prior Publication Data

US 2015/0271388 A1 Sep. 24, 2015

Related U.S. Application Data

(63) Continuation of application No. PCT/CN2013/087990, filed on Nov. 28, 2013.

(30) Foreign Application Priority Data

Dec. 10, 2012 (CN) .......................... 2012 1 0527646

(51) Int. Cl.
    *H04N 5/232* (2006.01)
    *H04N 5/76* (2006.01)
    *H04N 5/77* (2006.01)

(52) U.S. Cl.
    CPC ...... *H04N 5/23216* (2013.01); *H04N 5/23229* (2013.01); *H04N 5/23293* (2013.01); *H04N 5/23296* (2013.01); *H04N 5/76* (2013.01); *H04N 5/77* (2013.01)

(58) Field of Classification Search
    CPC ...................................................... H04N 5/232
    USPC .......................................... 348/207.1, 207.11
    See application file for complete search history.

(56) References Cited

U.S. PATENT DOCUMENTS

| 2006/0187310 A1* | 8/2006 | Janson, Jr. ............ H04N 5/2254 348/218.1 |
| 2012/0009896 A1* | 1/2012 | Bandyopadhyay ... G06F 1/1643 455/411 |
| 2013/0069893 A1* | 3/2013 | Brinda .................. G06F 3/0488 345/173 |

FOREIGN PATENT DOCUMENTS

| CN | 1794080 A    | 6/2006  |
| CN | 1279740 C    | 10/2006 |
| CN | 102075619 A  | 5/2011  |

OTHER PUBLICATIONS

International Search Report for International Application No. PCT/CN2013/087990, dated Feb. 27, 2014.

*Primary Examiner* — Joel Fosselman
(74) *Attorney, Agent, or Firm* — Harness, Dickey & Pierce, P.L.C.

(57) ABSTRACT

A photography initiation apparatus and method for a built-in camera of a portable data processing device includes creating a shortcut icon for starting a photography apparatus on a locked screen of a portable data processing device. The method includes starting a photography process after the photography initiation apparatus is started. The photographing process includes creating a window on a screen; opening a built-in camera; setting a focal length of the built-in camera to a preset focal length; associating a viewfinder of the built-in camera with the created window; starting the viewfinder of the built-in camera and displaying an image of the viewfinder; sending, after a photography instruction is detected, a photography signal to the built-in camera; and starting a background process or invoking a background process that is already started.

12 Claims, 2 Drawing Sheets

Figure 1:
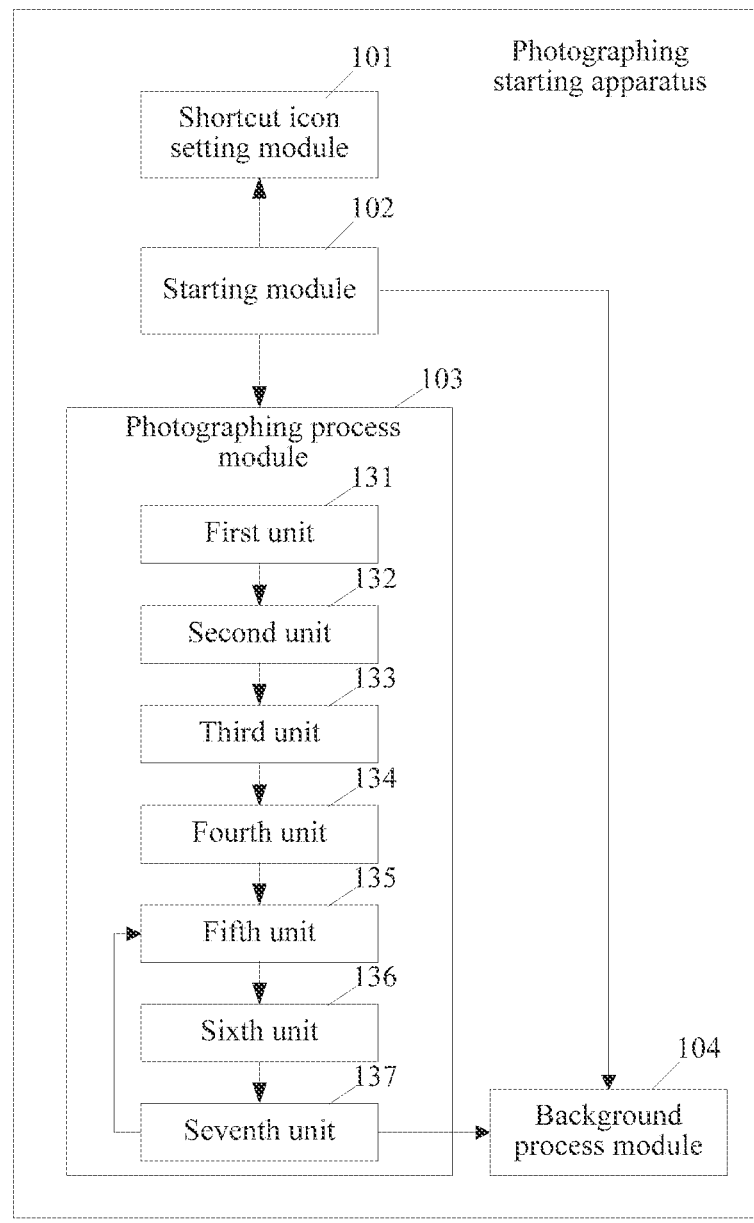

PHOTOGRAPHING STARTING APPARATUS AND METHOD FOR BUILT-IN CAMERA OF PORTABLE DATA PROCESSING DEVICE

CROSS-REFERENCE TO RELATED APPLICATIONS

This application is a continuation of International Application No. PCT/CN2013/087990, filed Nov. 28, 2013. This application claims the benefit and priority of Chinese Application No. 201210527646.6, filed Dec. 10, 2012. The entire disclosures of each of the above applications are incorporated herein by reference.

FIELD

The present disclosure relates to the field of built-in camera technologies for portable data processing devices and to a picture taking apparatus and method for a built-in camera of a portable data processing device.

BACKGROUND

This section provides background information related to the present disclosure which is not necessarily prior art.

A portable data processing device generally refers to a computing device capable of processing electronic data that is convenient to carry, such as a mobile telephone, a personal digital assistant (PDA), a pocket PC, or a tablet computer. Currently, portable data processing devices generally have a built-in digital camera and have a picture taking function or a video recording function. For example, presently, most mainstream mobile phones in the industry have a built-in camera and a user may take a picture and shoot a video by using a mobile phone.

With the improvement of the hardware performance of portable data processing devices, the speeds of processors for portable data processing devices have become faster and the pixel densities of built-in cameras have increased. Thus, images taken by the built-in cameras of portable data processing devices are of better quality. Therefore, more users tend to use a portable data processing device (for example, a mobile phone) to record pictures and videos of a scene at any time and any place, especially in a scenario suitable for photo capturing.

When a built-in camera in a portable data processing device takes a picture, photography software is needed for support and the photography software invokes the built-in camera to take a picture. When the photography software invokes the built-in camera to take a picture, an image collected by the built-in camera is displayed on a viewfinder. The viewfinder is displayed in a photography software window on a screen of the portable data processing device, and after a user presses the photography button, the photography software stores the image of the viewfinder, thereby implementing a photographing function.

Currently, a photography initiation method for a built-in camera of a portable data processing device is relatively complex. In addition to photography software, a portable data processing device further has other software functions, such as telephone software functions and application programs (APP) capable of implementing other specific functions. Icons of all the APPs need to be displayed on a screen of the portable data processing device. An icon of the photography software also needs to be displayed on a specific interface of the screen of the portable data processing device similar to the icons of the other APPs, and a user needs to have multiple interactions with the data processing device before entering the specific interface during photography. Moreover, when the portable data processing device is not used for a long period of time, the screen of the device is generally locked. The screen being locked refers to when a frame on the screen is locked, and the screen is unlocked when an unlock button is pressed, otherwise, the screen is not unlocked so as to prevent an undesired operation. In most cases, a user takes out a portable data processing device to take a picture when seeing a scene they would like to photograph. In this case, the portable data processing device is generally in a screen-locked state. The user needs to perform an unlock operation first and then enter a specific interface displaying a starting icon of the photography software after multiple interactions with the computer operations and click the starting icon to start the photography software. The user then needs to focus on a target according to an image displayed in the viewfinder and click the photograph button to complete photography after the focusing is completed.

Therefore, in the existing photography initiation method for a built-in camera of a portable data processing device, many human computer interaction operations are necessary. The operations are complex and the photography speed is slow. It takes a long period of time from the starting of the operations to the completion of photograph, so a photo capturing opportunity may be missed. Moreover, after an image is taken, it takes a long period of time to store the image before a viewfinder is restarted and returns to a photographing state, so the speed of continuous photography is slow and a photo capturing opportunity is often missed.

SUMMARY

This section provides a general summary of the disclosure, and is not a comprehensive disclosure of its full scope or all of its features.

In view of this, the present disclosure mainly provides a photography initiation apparatus and method for a built-in camera of a portable data processing device, so as to reduce the number of times human computer interaction operations are required, simplify the operation process, and improve the photographing speed.

A photography initiation apparatus for a built-in camera of a portable data processing device includes:

a shortcut icon setting module, configured to create a shortcut icon for starting a photography apparatus on a locked screen of a portable data processing device;

a starting module, configured to start a photography process module or start a photography process module and a background process module after the photography apparatus is started, the photography process module specifically including:

a first unit, configured to create a window on a screen of the portable data processing device;

a second unit, configured to open a built-in camera of the portable data processing device;

a third unit, configured to set a focal length of the built-in camera to a preset focal length;

a fourth unit, configured to associate a viewfinder of the built-in camera with the created window;

a fifth unit, configured to start the viewfinder of the built-in camera and display an image of the viewfinder;

a sixth unit, configured to detect a photographing instruction and send, after the photographing instruction is detected, a photographing signal to the built-in camera; and a seventh unit, configured to start a background process module or invoke a background process module that is already started, transmit data of an image taken by the built-in camera to the background process module, and go back to the fifth unit; and the background process module, configured to store the data of the image transmitted by the photographing process module.

A photography starting method for a built-in camera of a portable data processing device includes:

creating a shortcut icon for starting a photography starting apparatus on a locked screen of a portable data processing device; and starting a photography process or starting a photographing process and a background process after the photographing starting apparatus is started, the photographing process performing the following various operations:

A: creating a window on a screen of the portable data processing device;

B: opening a built-in camera of the portable data processing device;

C: setting a focal length of the built-in camera to a preset focal length;

D: associating a viewfinder of the built-in camera with the created window;

E: starting the viewfinder of the built-in camera and displaying an image of the viewfinder;

F: detecting a photography instruction and sending, after the photography instruction is detected, a photography signal to the built-in camera; and G: starting a background process or invoking a background process that is already started, transmitting data of an image taken by the built-in camera to the background process for storage, and going back to operation E of the photography process.

According to various embodiments, compared with the existing technology, a shortcut icon for starting a built-in camera is first created on a locked screen of a portable data processing device, so as to omit an unlock operation and directly start the built-in camera. After the built-in camera in the portable data processing device is opened, a focal length is automatically set to a preset focal length (for example, the preset focal length is a maximum focal length), so that a focus operation can be omitted; therefore, the amount of human computer interactions during a photographing starting process can be reduced effectively, the operation process can be simplified, the photography speed can be improved, and photography can be completed quickly, which is very convenient for photo capturing. Another process is then started to store data of a photographed image, and in the photography process, after an image is taken, the viewfinder is immediately restarted, and a view finder preview window is restored so that the next photographing process is not obstructed and it is convenient for a user to take the next image immediately. Therefore, compared with the existing technology, the speed of continuous photography is improved, which is very convenient photo capturing.

Further areas of applicability will become apparent from the description provided herein. The description and specific examples in this summary are intended for purposes of illustration and are not intended to limit the scope of the present disclosure.

DRAWINGS

The drawings described herein are for illustrative purposes of various embodiments and not all possible implementations, and are not intended to limit the scope of the present disclosure.

Figure 2:
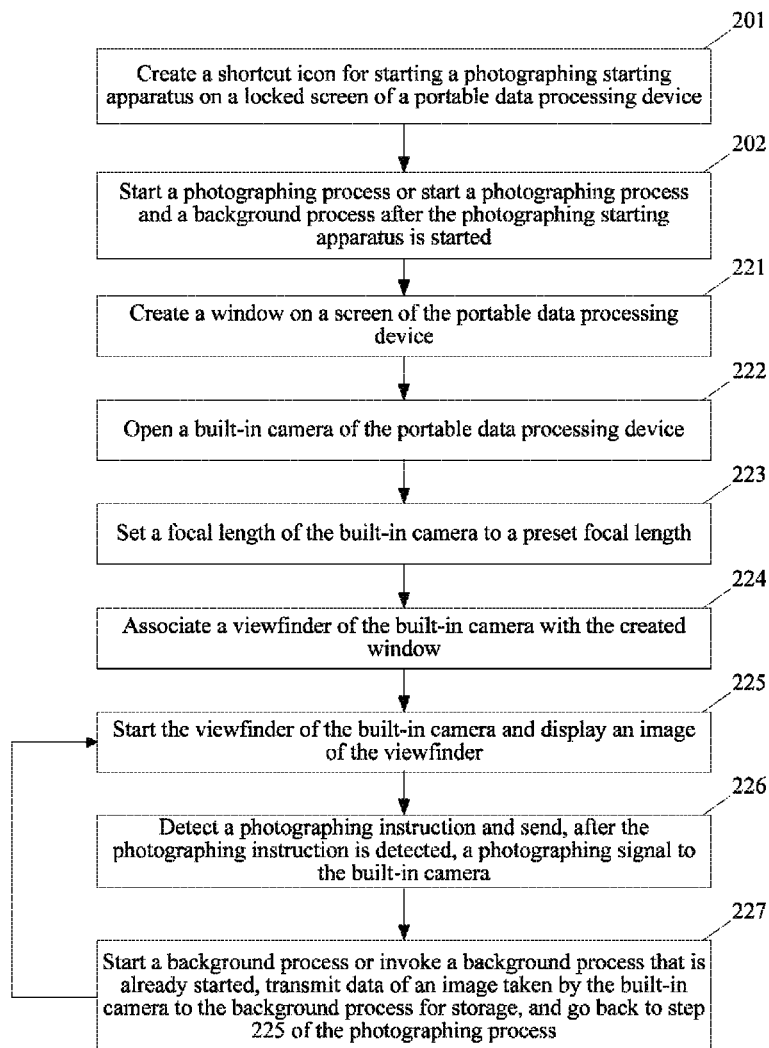

FIG. 1 is a composition diagram of a photography initiating apparatus for a built-in camera of a portable data processing device according to various embodiments; and FIG. 2 is a flowchart of a photography initiating method for a built-in camera of a portable data processing device according to various embodiments.

Corresponding reference numerals indicate corresponding parts throughout the several views of the drawings.

DETAILED DESCRIPTION

Example embodiments will now be described more fully with reference to the accompanying drawings.

The following further describes the present disclosure in detail with reference to the accompanying drawings and various embodiments.

FIG. 1 is a composition diagram of a photographing starting apparatus for a built-in camera of a portable data processing device according to various embodiments. The photographing starting apparatus is application software installed in a portable data processing device.

A shortcut icon setting module 101 is configured to create a shortcut icon for starting a photographing apparatus on a locked screen of a portable data processing device.

A starting module 102 is configured to start a photographing process module 103 or start a photography process module 103 and a background process module 104 after the photography initiation process is started.

The photography process module 103 specifically includes a first unit 131, configured to create a window on a screen of the portable data processing device. A second unit 132 is configured to open a built-in camera of the portable data processing device. A third unit 133 is configured to set a focal length of the built-in camera to a preset focal length. A fourth unit 134 is configured to associate a viewfinder of the built-in camera with the created window. A fifth unit 135 is configured to start the viewfinder of the built-in camera and display an image of the viewfinder, that is, display the image of the viewfinder in the created window, where the window is equivalent to a viewfinder preview window. A sixth unit 136 is configured to detect a photographing instruction and send, after the photographing instruction is detected, a photographing signal to the built-in camera, where the built-in camera takes an image when receiving the photographing signal. A seventh unit 137 is configured to start a background process module 104 or invoke a background process module 104 that is already started, transmit data of an image taken by the built-in camera to the background process module 104, and go back to the fifth unit 135. The background process module 104 is configured to store the data of the image transmitted by the photography process module 103, that is, store the data of the image in a local device or a network device.

Times for triggering the shortcut icon setting module 101 may be different according to different restrictions of operating systems of portable data processing devices. For an operating system of a portable data processing device, which allows creation of a shortcut icon on a locked screen when an APP is installed, the shortcut icon setting module 101 may be triggered during installation of the photographing starting apparatus according to various embodiments, so as to create the shortcut icon for starting the photography initiating apparatus on the locked screen of the portable data processing device.

For an operating system of a portable data processing device, which does not allow creation of a shortcut icon on a locked screen when an APP is installed, for example, an Android operating system, the shortcut icon setting module 101 is not triggered during installation of the photography initiating apparatus according to various embodiments and the shortcut icon setting module 101 is triggered when the photographing starting apparatus runs for the first time, so as to create the shortcut icon for starting photographing on the locked screen of the portable data processing device. According to various embodiments, the starting module 102 is further configured to determine, whether the photography initiating apparatus is started in the portable data processing device for the first time after the photography initiating apparatus is started and trigger, if yes, the shortcut icon setting module 101 to create the shortcut icon for starting the photography initiating apparatus on the locked screen, and then start the photography process module 103 or start the photography process module 103 and the background process module 104. Otherwise, directly start the photography process module 103 or directly start the photography process module 103 and the background process module 104. The photography apparatus herein is started by clicking a starting icon of photographing software.

The created shortcut icon on the locked screen points to the photography initiating apparatus according to various embodiments, that is, the shortcut icon on the locked screen is associated with the photography initiating apparatus. After the shortcut icon is clicked, the photography initiating apparatus according to various embodiments is directly started and run, thereby omitting an unlock operation and directly enabling a built-in camera, reducing the amount of human computer operations and simplifying operations for starting the built-in camera.

To improve a photography initiating speed of the photography process module 103, the first unit 131 may create one window on the screen of the portable data processing device, so as to associate the window with the viewfinder of the built-in camera. The window is a control. However, in photography software in the existing technology, in addition to a window control, a photographing interface of the photography software further includes many other controls, such as an option button control and a data control for displaying text. These controls reduce the photography initiating speed of the photographing software, so a user often misses a photo capturing opportunity. However, according to various embodiments, the first unit 131 may create one window on the screen of the portable data processing device, so that the control uses few resources and the photography initiating speed of the photography initiating apparatus is improved. According to various embodiments, other controls may be created if necessary, but the quantity of created controls should be as small as possible.

According to various embodiments, a specific manner for opening, by the second unit 132, the built-in camera of the portable data processing device invokes an interface instruction of an operating system of the portable data processing device to open the built-in camera. For example, in an Android operating system, an interface instruction Camera.open (int id) is used to open a built-in camera.

The third unit 133 is a parameter setting unit, configured to set a parameter of the built-in camera, where at least a focal length of the built-in camera is set to a preset focal length. The preset focal length may be preset by a developer or a user, and suitable preset focal lengths may be set in different scenarios. The preset focal length is a maximum focal length, that is, a focal length of the built-in camera is set to a maximum focal length. For example, in an Android operating system, an interface instruction Parameters.setFocusMode (FOCUS_MODE_INFINITY) is specifically invoked to set a focal length of a built-in camera to a maximum focal length. According to various embodiments, the focal length is automatically set to a preset focal length (for example, the preset focal length is a maximum focal length). After the focal length of the built-in camera is set to the preset focal length, a focus operation can be omitted. Therefore, the number of human computer interactions during a photography initiating process can be reduced effectively, the operation process can be simplified, the photography speed can be improved, and photography can be completed quickly, which is very convenient for photo capturing.

According to various embodiments, the third unit 133 is further configured to set the flash of the built-in camera to be off. For example, in an Android operating system, an interface instruction Parameters.setFlashMode (FLASH_MODE_OFF) is invoked to set the flash of a built-in camera to be off. This is because the flash of a built-in camera reduces the processing speed of photographing. Therefore, according to various embodiments, the flash of the built-in camera is further set to be off, thereby further improving the photography initiating speed.

According to various embodiments, the third unit 133 is further configured to set the size or resolution of an image taken by the built-in camera. For example, the size or resolution of a photograph is selected according to the preset instruction. In an Android operating system, the interface instruction Parameters.setPictureSize(int width, int height) is invoked to set the size of a photograph and an interface instruction Parameters.setPreviewSize(int width, int height) is invoked to set the size of each frame of data collected by hardware of the built-in camera. Selection of a suitable size or resolution, which matches the model of the portable data processing device, of a photograph can further improve the photographing speed and make it convenient for a user to capture a photo while ensuring picture quality.

The third unit 133 may further match the size of the viewfinder of the built-in camera with the size of the created window. For example, in an Android operating system, a specific matching method is setting a width, that is, a parameter WindowManager.LayoutParams.width, of the viewfinder to a value matching the width of the window, where the value is generally the same as or closest to a value of the width of the window and setting a height, that is, a parameter WindowManager.LayoutParams.height, of the viewfinder to a value matching a height of the window, where the value is generally the same as or closest to the value of the height of the window. The size of the viewfinder of the built-in camera is matched with the size of the created window, so that an image displayed in the viewfinder can be further placed within the window, thereby reducing an effect of an excessively large default size of the viewfinder on a photographing speed.

The third unit 133 may be further configured to set other parameters of the built-in camera, for example, set a white balance parameter and other parameters.

A manner for associating, through the fourth unit 134, the viewfinder of the built-in camera with the created window is invoking a viewfinder association interface of the operating system of the portable data processing device to complete the association. For example, in an Android operating system, an interface instruction Camera.setPreviewDisplay (SurfaceHolder holder) is invoked to associate a viewfinder of a built-in camera with a created window.

According to various embodiments, the sixth unit 136 is specifically configured to detect an event of clicking the screen of the portable data processing device. The event of clicking the screen of the portable data processing device includes any point of the screen of the portable data processing device being clicked. Sixth unit 136 determines, if the event of clicking the screen of the portable data processing device is detected, that the photographing instruction is detected and send the photographing signal to the built-in camera. Sixth unit 136 detects an event of clicking the created window, where the event of clicking the created window includes any point within the created window being clicked. Sixth Unit 136 determines if the event of clicking the created window is detected, that the photographing instruction is detected and sends the photographing signal to the built-in camera. Sixth unit 136 detects an event of clicking the image of the viewfinder, where the event of clicking the image of the viewfinder includes any point within the image of the viewfinder being clicked. Sixth unit 136 then determines, if the event of clicking the image of the viewfinder is detected, that the photography instruction is detected and send the photographing signal to the built-in camera.

When taking photos or a video, a user generally operates a built-in camera of a portable data processing device with one hand. In the existing technology, the photography instruction of photography software is generally triggered by a specific photography button and a user needs to click the specific photography button with one hand. Considering both a left-hand operation and a right-hand operation, the photography button is generally disposed in the middle at the bottom of a screen, and is therefore far from the operating finger (which is generally a thumb) of the user. Therefore, when the user operates with one hand and presses the photography button, the hand generally trembles, which causes a vague shadow appearing in the photograph. This is particularly conspicuous when the size of a portable data processing device is large.

According to various embodiments, the sixth unit 136 detects a photography instruction, and as soon as the event of clicking the entire screen of the portable data processing device, the created window, or the image of the viewfinder is detected, photography is triggered. Through this method, when the portable data processing device is operated with one hand, there is no need to move the finger a long distance to trigger the photography button and only a click on the screen is needed, which not only makes it convenient for a user to operate with one hand, but also prevents hand trembling during photography and further prevents a vague shadow during photography, thereby improving photographic quality when the portable data processing device is operated with one hand.

According to various embodiments, the window created by the first unit 131 may not need to occupy the entire screen, which can reduce the usage of device resources and improve the photography initiation speed. The sixth unit 136 is configured to detect the event of clicking the entire screen of the portable data processing device and determine, if it is detected that any point on the screen of the portable data processing device is clicked, that the photography instruction is detected and sends the photography initiation to the built-in camera. Through this method, the photographing starting speed can be improved significantly, Because it is more convenient for a user to operate with one hand, hand trembling is prevented, and photographing quality when the portable data processing device is operated with one hand is improved.

The foregoing various embodiments are merely exemplary. For example, the unit division is merely logical function division and there may be other division in actual implementation. For example, multiple modules or units therein may be integrated into one processing module or unit or each of the modules or units may exist alone.

The present disclosure further discloses a photographing starting method for a built-in camera of a portable data processing device, which corresponds to the foregoing photography initiation apparatus, and is performed by the photography initiation apparatus. FIG. 2 is a flowchart of a photography initiation method for a built-in camera of a portable data processing device according to various embodiments.

S201: Create a shortcut icon for starting a photography initiation apparatus on a locked screen of a portable data processing device. The shortcut icon points to the photographing starting apparatus, and when the shortcut icon is clicked, the photographing starting apparatus is started.

S202: Start a photography process or start a photography process and a background process after the photography initiation apparatus is started.

After the photographing process is started, the following S221 through S227 are executed.

S221: Create a window on a screen of the portable data processing device.

S222: Open a built-in camera of the portable data processing device.

For example, in an Android operating system, the interface instruction Camera.open(int id) is used to open a built-in camera.

S223: Set the focal length of the built-in camera to a preset focal length, where the preset focal length is, for example, a maximum focal length. A method is, for example, in an Android operating system, the interface instruction Parameters.setFocusMode(FOCUS_MODE_INFINITY) is invoked to set the focal length of a built-in camera to a preset focal length.

S224: Associate a viewfinder of the built-in camera with the created window. For example, in an Android operating system, the interface instruction Camera.setPreviewDisplay (SurfaceHolder holder) is invoked to associate a viewfinder of a built-in camera with a created window.

S225: Start the viewfinder of the built-in camera and display an image of the viewfinder.

S226: Detect a photography instruction and send, after the photography instruction is detected, a photography signal to the built-in camera. The built-in camera performs a corresponding image photography action after receiving the photography signal.

S227: Start a background process or invoke a background process that is already started, transmit data of an image taken by the built-in camera to the background process for storage, and go back to S225 of the photography process.

After the built-in camera obtains image data by photography, before the image data is transmitted to the background process for storage, the photography process may further perform various prompt operations. For example, provide a user with a prompt indicating whether an image needs to be stored or provide a user with a prompt indicating where an image should be stored. For example, store the picture in a local device or upload the picture to a network device for storage.

In an operating system of a portable data processing device which allows the creation of a shortcut icon on a locked screen when an APP is installed, the shortcut icon for starting the photography initiation apparatus may be created on the locked screen of the portable data processing device during installment of the photography initiation apparatus according to various embodiments.

In an operating system of a portable data processing device which does not allow the creation of a shortcut icon on a locked screen when an APP is installed, the shortcut icon for starting the photography initiation apparatus is not created on the locked screen of the portable data processing device during installment of the photography initiation apparatus according to various embodiments, and the shortcut icon for starting photography is created on the locked screen of the portable data processing device when the photography starting apparatus runs for the first time. Therefore, according to various embodiments, after the photography initiation apparatus is started, before the photography process is started, or before the photography process and the background process are started, the various embodiments further include determining whether the photography initiation apparatus is started in the portable data processing device for the first time and creating, if yes, the shortcut icon for starting the photography initiation apparatus on the locked screen of the portable data processing device, and then enabling the photography process or enabling the photography process and the background process. Otherwise, directly enabling the photography process or directly enabling the photography process and the background process. The photography apparatus herein is started by clicking a starting icon of photographing software.

According to various embodiments, a manner for creating the window on the screen of the portable data processing device in S221 is creating one window on the screen of the portable data processing device. When one control is created, few resources are used, thereby improving a photography initiating speed of the photography initiating apparatus. According to various embodiments, other controls may be further created if necessary, but the quantity of created controls should be as small as possible.

In order to further improve a photography initiation speed, according to various embodiments, S223 may further include setting the flash of the built-in camera to be off. For example, in an Android operating system, the interface instruction Parameters.setFlashMode(FLASH_MODE_OFF) is invoked to set a flash of a built-in camera to be off, so as to reduce device resources used by the flash and improve the photography initiation speed.

According to various embodiments, S223 may further include setting the size or resolution of a picture taken by the built-in camera and matching the size of the viewfinder of the built-in camera with the size of the created window. For example, the size or resolution of a taken picture is selected according to a preset instruction. In an Android operating system, the interface instruction Parameters.setPictureSize (int width, int height) is invoked to set the size of a photograph and the interface instruction Parameters.setPreviewSize(int width, int height) is invoked to set the size of each frame of data collected by hardware of the built-in camera. A width, that is, a parameter WindowManager.LayoutParams.width, of the viewfinder is set to the value matching the width of the window, where the value is generally the same as or closest to the value of the width of the window, and a height, that is, a parameter WindowManager.LayoutParams.height, of the viewfinder is set to a value matching the height of the window, where the value is generally the same as or closest to the value of the height of the window. Through these processes, a photographing starting speed can be further improved.

According to various embodiments, a method for detecting the photographing instruction in S226 is detecting an event of clicking the entire screen of the portable data processing device. The event of clicking the screen of the portable data processing device includes where any point of the screen of the portable data processing device is clicked, and determining, if the event of clicking the screen of the portable data processing device is detected, that the photographing instruction is detected. S226 detects an event of clicking the created window, where the event of clicking the created window includes where any point within the created window is clicked, and determining, if the event of clicking the created window is detected, that the photographing instruction is detected. In various embodiments, S226 detects an event of clicking the image of the viewfinder, where the event of clicking the image of the viewfinder includes where any point within the image of the viewfinder is clicked, and determining, if the event of clicking the image of the viewfinder is detected, that the photographing instruction is detected.

According to various embodiments, the window created in S221 may not need to occupy the entire screen, but occupies a portion of the screen, which can reduce the usage of device resources and improve a photographing starting speed. S226 includes detecting an event of clicking the entire screen of the portable data processing device, determining, if it is detected that any point on the screen of the portable data processing device is clicked, that the photographing instruction is detected, and sending the photographing signal to the built-in camera. Through this method, a photography initiation speed can be improved as much as possible, it is more convenient for a user to operate with one hand, hand trembling is prevented, and photography quality when the portable data processing device is operated with one hand is improved.

The foregoing descriptions are example embodiments of the present disclosure, but are not intended to limit the present disclosure. Any modification, equivalent replacement, or improvement made within the spirit and principle of the present disclosure shall fall within the protection scope of the present disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

What is claimed is:

1. A photographing starting apparatus for a built-in camera of a portable data processing device, comprising:
a processor for executing instructions stored in a non-transitory machine readable storage medium to execute the following:

determining, after the photographing starting apparatus is started, whether the photographing starting apparatus is started in the portable data processing device for the first time, and trigger, if yes, create a shortcut icon for starting the photographing starting apparatus on a locked screen;

after the photographing starting apparatus is started, starting a photographing process or start a photographing process and a background process, the photographing process:

creating a window on a screen of the portable data processing device;

opening a built-in camera of the portable data processing device;

setting a focal length of the built-in camera to a preset focal length;

associating a viewfinder of the built-in camera with the created window;

starting the viewfinder of the built-in camera and display an image of the viewfinder in the created window;

detecting a photographing instruction and send, after the photographing instruction is detected, a photographing signal to the built-in camera; and starting the background process or invoke a background process that is already started, transmit data of an image taken by the built-in camera to the background process, and go back to the process of starting the viewfinder of the built-in camera and display an image of the viewfinder in the created window in the photographing process; and the background process: storing the data of the image transmitted by the photographing process.

2. The apparatus according to claim 1, wherein the preset focal length is a maximum focal length.

3. The apparatus according to claim 1, wherein the computer program comprises instructions further to: set a flash of the built-in camera to be in a turned-off state.

4. The apparatus according to claim 3, wherein the computer program comprises instructions further to: set a size or resolution of a picture taken by the built-in camera and match a size of the viewfinder of the built-in camera with a size of the created window.

5. The apparatus according to claim 1, wherein the computer program comprises instructions to:

detect an event of clicking the screen of the portable data processing device, wherein the event of clicking the screen of the portable data processing device comprises that any point of the screen of the portable data processing device is clicked, and determine, if the event of clicking the screen of the portable data processing device is detected, that the photographing instruction is detected and send the photographing signal to the built-in camera; or detect an event of clicking the created window, wherein the event of clicking the created window comprises that any point within the created window is clicked, and determine, if the event of clicking the created window is detected, that the photographing instruction is detected and send the photographing signal to the built-in camera; or detect an event of clicking the image of the viewfinder, wherein the event of clicking the image of the viewfinder comprises that any point within the image of the viewfinder is clicked, and determine, if the event of clicking the image of the viewfinder is detected, that the photographing instruction is detected and send the photographing signal to the built-in camera.

6. The apparatus according to claim 1, wherein the computer program comprises instructions to:

create a window occupying a part of the screen on the screen of the portable data processing device; and detect an event of clicking the screen of the portable data processing device, wherein the event of clicking the screen of the portable data processing device comprises that any point of the screen of the portable data processing device is clicked, and determine, if the event of clicking the screen of the portable data processing device is detected, that the photographing instruction is detected and send the photographing signal to the built-in camera.

7. A photographing starting method for a built-in camera of a portable data processing device, comprising:

determining whether the photographing starting apparatus is started in the portable data processing device for the first time, and creating, if yes, a shortcut icon for starting the photographing starting apparatus on a locked screen of the portable data processing device; and starting a photographing process or starting a photographing process and a background process after the photographing starting apparatus is started, the photographing process performing:

creating a window on a screen of the portable data processing device;

opening a built-in camera of the portable data processing device;

setting a focal length of the built-in camera to a preset focal length;

associating a viewfinder of the built-in camera with the created window;

starting the viewfinder of the built-in camera and displaying an image of the viewfinder in the created window;

detecting a photographing instruction and sending, after the photographing instruction is detected, a photographing signal to the built-in camera; and starting a background process or invoking a background process that is already started, transmitting data of an image taken by the built-in camera to the background process for storage, and going back to the process of starting the viewfinder of the built-in camera and display an image of the viewfinder in the photographing process.

8. The method according to claim 7, wherein the preset focal length is a maximum focal length.

9. The method according to claim 7, further comprising: setting a flash of the built-in camera to be in a turned-off state.

10. The method according to claim 9, further comprising:

setting a size or resolution of a picture taken by the built-in camera; and matching a size of the viewfinder of the built-in camera with a size of the created window.

11. The method according to claim 7, wherein a specific method for the detecting a photographing instruction in the process of detecting a photographing instruction and send, after the photographing instruction is detected, a photographing signal to the built-in camera is:

detecting an event of clicking the screen of the portable data processing device, wherein the event of clicking the screen of the portable data processing device comprises that any point of the screen of the portable data processing device is clicked, and determining, if the event of clicking the screen of the portable data processing device is detected, that the photographing instruction is detected;

detecting an event of clicking the created window, wherein the event of clicking the created window comprises that any point within the created window is clicked, and determining, if the event of clicking the created window is detected, that the photographing instruction is detected; or detecting an event of clicking the image of the viewfinder, wherein the event of clicking the image of the viewfinder comprises that any point within the image of the viewfinder is clicked, and determining, if the event of clicking the image of the viewfinder is detected, that the photographing instruction is detected.

12. The method according to claim 7, wherein creating a window on a screen of the portable data processing device specifically comprises: creating a window occupying a part of the screen on the screen of the portable data processing device; and detecting a photographing instruction and sending, after the photographing instruction is detected, a photographing signal to the built-in camera specifically comprises: detecting an event of clicking the screen of the portable data processing device, wherein the event of clicking the screen of the portable data processing device comprises that any point of the screen of the portable data processing device is clicked, and determining, if the event of clicking the screen of the portable data processing device is detected, that the photographing instruction is detected and sending the photographing signal to the built-in camera.

* * * * *